US009655026B2

(12) United States Patent
Bondrescu et al.

(10) Patent No.: US 9,655,026 B2
(45) Date of Patent: May 16, 2017

(54) METHODS, SYSTEMS, AND COMPUTER READABLE MEDIA FOR DISTRIBUTING GENERAL PACKET RADIO SERVICE (GPRS) TUNNELING PROTOCOL (GTP) TRAFFIC

(71) Applicant: Ixia, Calabasas, CA (US)

(72) Inventors: Adrian Lucian Bondrescu, Caracal (RO); Sorin-Cristian Popescu, Calarasi (RO)

(73) Assignee: Ixia, Calabasas, CA (US)

( * ) Notice: Subject to any disclaimer, the term of this patent is extended or adjusted under 35 U.S.C. 154(b) by 148 days.

(21) Appl. No.: 14/325,341

(22) Filed: Jul. 7, 2014

(65) Prior Publication Data

US 2016/0007392 A1 Jan. 7, 2016

(30) Foreign Application Priority Data

Jul. 4, 2014 (RO) ...................................... 14-0518

(51) Int. Cl.
*H04L 12/26* (2006.01)
*H04W 40/00* (2009.01)
*H04W 16/22* (2009.01)

(52) U.S. Cl.
CPC ........... *H04W 40/00* (2013.01); *H04W 16/22* (2013.01)

(58) Field of Classification Search
CPC ......... H04L 43/50; H04L 43/00; H04L 12/26; H04L 43/18
See application file for complete search history.

(56) References Cited

U.S. PATENT DOCUMENTS

| 7,710,966 B1 * | 5/2010 | Biro ...................... H04L 45/00 370/230.1 |
| 8,036,230 B2 | 10/2011 | Gray et al. |

(Continued)

FOREIGN PATENT DOCUMENTS

EP 2 654 340 A1 10/2013

OTHER PUBLICATIONS

"Load-Balancing Algorithms," IP Switching Cisco Express Forwarding Configuration Guide, Cisco IOS XE Release 3S, http://www.cisco.com/c/en/us/td/docs/ios-xml/ios/ipswitch_cef/configuration/xe-3s/isw-cef-xe-3s-book/isw-cef-load-balancing.html#concept_3C8798DC060D459F8605C293F4834D3A, pp. 1-2 (Apr. 2, 2014, downloaded from the Internet May 12, 2014).

(Continued)

*Primary Examiner* — Jeffrey M Rutkowski
*Assistant Examiner* — Kenan Cehic
(74) *Attorney, Agent, or Firm* — Jenkins, Wilson, Taylor & Hunt, P.A.

(57) ABSTRACT

Methods, systems, and computer readable media for distributing general packet radio service (GPRS) tunneling protocol (GTP) traffic are disclosed. According to one exemplary method, the method occurs at a network node simulator configured to distribute GTP encapsulated data packets among a plurality of processors associated with the network node simulator. The method includes receiving a GTP encapsulated data packet associated with a user device, wherein the GTP encapsulated data packet includes a GTP header having a GTP related endpoint identifier indicating a processor among the plurality of processors associated with the network node simulator. The method also includes determining, using the GTP related endpoint identifier, the processor for processing the GTP encapsulated data packet.

(Continued)

The method further includes sending, to the processor, the GTP encapsulated data packet for processing.

12 Claims, 5 Drawing Sheets

(56) References Cited

U.S. PATENT DOCUMENTS

| | | |
|---|---|---|
| 8,804,716 B2 | 8/2014 | Bulboaca et al. |
| 8,929,356 B2 | 1/2015 | Pandey et al. |
| 2006/0256720 A1* | 11/2006 | Curran-Gray ....... H04W 28/085 370/235 |
| 2008/0139207 A1 | 6/2008 | Son et al. |
| 2008/0219229 A1 | 9/2008 | Zheng |
| 2009/0175333 A1 | 7/2009 | Hsiang |
| 2010/0103862 A1* | 4/2010 | Ulupinar ........... H04L 29/12207 370/315 |
| 2010/0189103 A1 | 7/2010 | Bachmann et al. |
| 2011/0150211 A1 | 6/2011 | Anderson |
| 2012/0213073 A1* | 8/2012 | Ang ................... H04W 28/085 370/235 |
| 2013/0031271 A1 | 1/2013 | Bosch et al. |
| 2014/0025800 A1 | 1/2014 | Sharma |
| 2014/0086068 A1* | 3/2014 | Borsos ................ H04L 12/4633 370/248 |
| 2015/0036513 A1* | 2/2015 | Bukin ................. H04L 43/0888 370/250 |

OTHER PUBLICATIONS

Notice of Allowance and Fee(s) Due for U.S. Appl. No. 13/458,602 (Apr. 1, 2014).

Applicant-Initiated Interview Summary for U.S. Appl. No. 13/458,602 (Feb. 21, 2014).

Non-Final Office Action for U.S. Appl. No. 13/458,602 (Oct. 18, 2013).

"3rd Generation Partnership Project; Technical Specification Group Core Network and Terminals; Numbering, addressing and identification (Release 11)," 3GPP TS 23.003 V11.9.0, pp. 1-84 (Sep. 2014).

"3rd Generation Partnership Project; Technical Specification Group Services and System Aspects; General Packet Radio Service (GPRS) enhancements for Evolved Universal Terrestrial Radio Access Network (E-UTRAN) access (Release 11)," 3 GPP TS 23.401 V11.10.0, pp. 1-286 (Jun. 2014).

3rd Generation Partnership Project; Technical Specification Group Services and System Aspects; 3GPP System Architecture Evolution (SAE); Security architecure (Release 11), 3GPP TS 33.401 V11.7.0, pp. 1-121 (Jun. 2013).

* cited by examiner

| BIT | 0-2 | 3 | 4 | 5 | 6 | 7 | 8-15 | 16-23 | 24-31 |
|---|---|---|---|---|---|---|---|---|---|
| 0 | VERSION | PROTOCOL TYPE | RESERVED | EHF | SNF | NNF | MESSAGE TYPE | TOTAL LENGTH | |
| 32 | PROCESS ID (TEID) | | | | | | | TUNNEL ID (TEID) | |
| 64 (32 IF TEID NOT PRESENT) | SEQUENCE NUMBER | | | | | | | N-PDU NUMBER | NEXT EXTENSION HEADER TYPE |

METHODS, SYSTEMS, AND COMPUTER READABLE MEDIA FOR DISTRIBUTING GENERAL PACKET RADIO SERVICE (GPRS) TUNNELING PROTOCOL (GTP) TRAFFIC

PRIORITY CLAIM

This application claims the benefit of Romanian Patent Application No. A/00518/2014, filed Jul. 4, 2014; the disclosure of which is incorporated herein by reference in its entirety.

TECHNICAL FIELD

The subject matter described herein relates to mobile network equipment testing. More specifically, the subject matter relates to methods, systems, and computer readable media for distributing GTP traffic.

BACKGROUND

In some mobile networks, user devices (e.g., smartphones, computers, mobile handsets, or other user equipment (UE)) may be connected to a core network and/or the Internet via a radio access network (RAN). Each mobile network may include transceivers, such as base stations, node Bs, or evolved node Bs (eNBs), for facilitating communications between user devices, networks, and/or nodes (e.g., web and media servers). In a voice over Internet protocol (VoIP) environment, a GTP protocol (e.g., an evolved GTP (eGTP) protocol) may be used to transport Internet protocol (IP) packets from external packet networks to user devices.

Network operators want testing equipment capable of testing nodes that handle large amounts of GTP traffic received via high density (e.g., 40 Gigabit per second (Gbps)) ports. For example, network operators may want to test nodes in an evolved packet core (EPC) may be required to generate, receive, and process GTP (e.g., eGTP) traffic associated with numerous sessions and/or user devices. To handle large amounts of GTP traffic, a testing platform may require significant resources, including a multi-processor architecture. While a multi-processor architecture may be beneficial for handling large amounts of GTP traffic, issues can arise with regard to traffic distribution. For example, a conventional testing platform that includes multi-processor hardware would still be overloaded because, most of the time, one processor would receive most or even all of the GTP traffic.

Accordingly, in light of these difficulties, a need exists for improved methods, systems, and computer readable media for distributing GTP traffic.

SUMMARY

Methods, systems, and computer readable media for distributing general packet radio service (GPRS) tunneling protocol (GTP) traffic are disclosed. According to one exemplary method, the method occurs at a network node simulator configured to distribute GTP encapsulated data packets among a plurality of processors associated with the network node simulator. The method includes receiving a GTP encapsulated data packet associated with a user device, wherein the GTP encapsulated data packet includes a GTP header having a GTP related endpoint identifier indicating a processor among the plurality of processors associated with the network node simulator. The method also includes determining, using the GTP related endpoint identifier, the processor for processing the GTP encapsulated data packet. The method further includes sending, to the processor, the GTP encapsulated data packet for processing.

According to one exemplary system, the system includes a network node simulator including a plurality of processors. The network node simulator is configured to distribute GTP encapsulated data packets among a plurality of processors associated with the network node simulator by receiving a GTP encapsulated data packet associated with a user device, wherein the GTP encapsulated data packet includes a GTP header having a GTP related endpoint identifier indicating a processor among the plurality of processors associated with the network node simulator, determining, using the GTP related endpoint identifier, the processor for processing the GTP encapsulated data packet, and sending, to the processor, the GTP encapsulated data packet for processing.

The subject matter described herein may be implemented in software in combination with hardware and/or firmware. For example, the subject matter described herein may be implemented in software executed by a processor (e.g., a hardware-based processor). In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the term "GTP protocol" refers to a GTP protocol or variant or version thereof, e.g., an eGTP protocol, a GTP-C protocol, a GTP-U protocol, a GTP prime (GTP') protocol, a GTP version 1 protocol, a GTP version 2 protocol, or a similar tunneling protocol.

As used herein, the term "module" refers to hardware, firmware, and/or software in combination with hardware and/or firmware for implementing features described herein. For example, a module may include or utilize a field-programmable gateway array (FPGA), an application-specific integrated circuit (ASIC), or a processor.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for distributing GTP traffic. Conventional testing equipment receives GTP traffic and attempts to offload data packets for processing. For example, testing equipment may receive GTP traffic associated with multiple simulated user devices or user equipment (UEs). In general, as the number of data packets increases, the amount of resources (e.g., number of processors) needed for processing the data packets at or near line speed increases. However, issues arise when attempting to use or allocate processing resources efficiently. In particular, conventional processing allocation is typically based on round-robin scheduling or other methods that fail to effectively load balance or load share GTP traffic (e.g., one or more GTP encapsulated data packets) among processing resources. For example, conventional processing allocation techniques fail to ensure that processing resources are substantially evenly utilized.

Advantageously, some aspects of the present subject matter herein are directed to a computing platform or module configured to efficiently distribute GTP traffic (e.g., GTP encapsulated data packets) among a plurality of processors. For example, a testing platform may be configured to allocate GTP related endpoint identifiers (e.g., tunnel endpoint identifiers (TEIDs) at or during one or more GTP establishment procedures, such as an initial attachment procedure, a packet data network (PDN) connectivity procedure, or a dedicated bearer procedure. In this example, each GTP related endpoint identifier may include a processor identifier (e.g., the six most significant bits of a 32-bit TEID) for indicating a related processor or other component that is to process related GTP traffic. Continuing with this example, when receiving a GTP encapsulated data packet, the testing platform or a related entity (e.g., a FPGA) may distribute the GTP encapsulated data packet to a processor as indicated by a GTP related endpoint identifier in a GTP header portion of the GTP encapsulated data packet.

In contrast to some aspects of the present subject matter herein, conventional GTP header information, including TEIDs, does not provide processor identifiers for indicating a particular processor among a plurality of processors for handling GTP encapsulated data packets. Hence, by assigning UEs and/or their related traffic among a plurality of processors and/or by storing processor identifiers in GTP header information for indicating particular processors for processing GTP traffic, aspects of the present subject matter herein may include efficient techniques for allocating and/or distributing GTP traffic among multiple processors.

Figure 1:
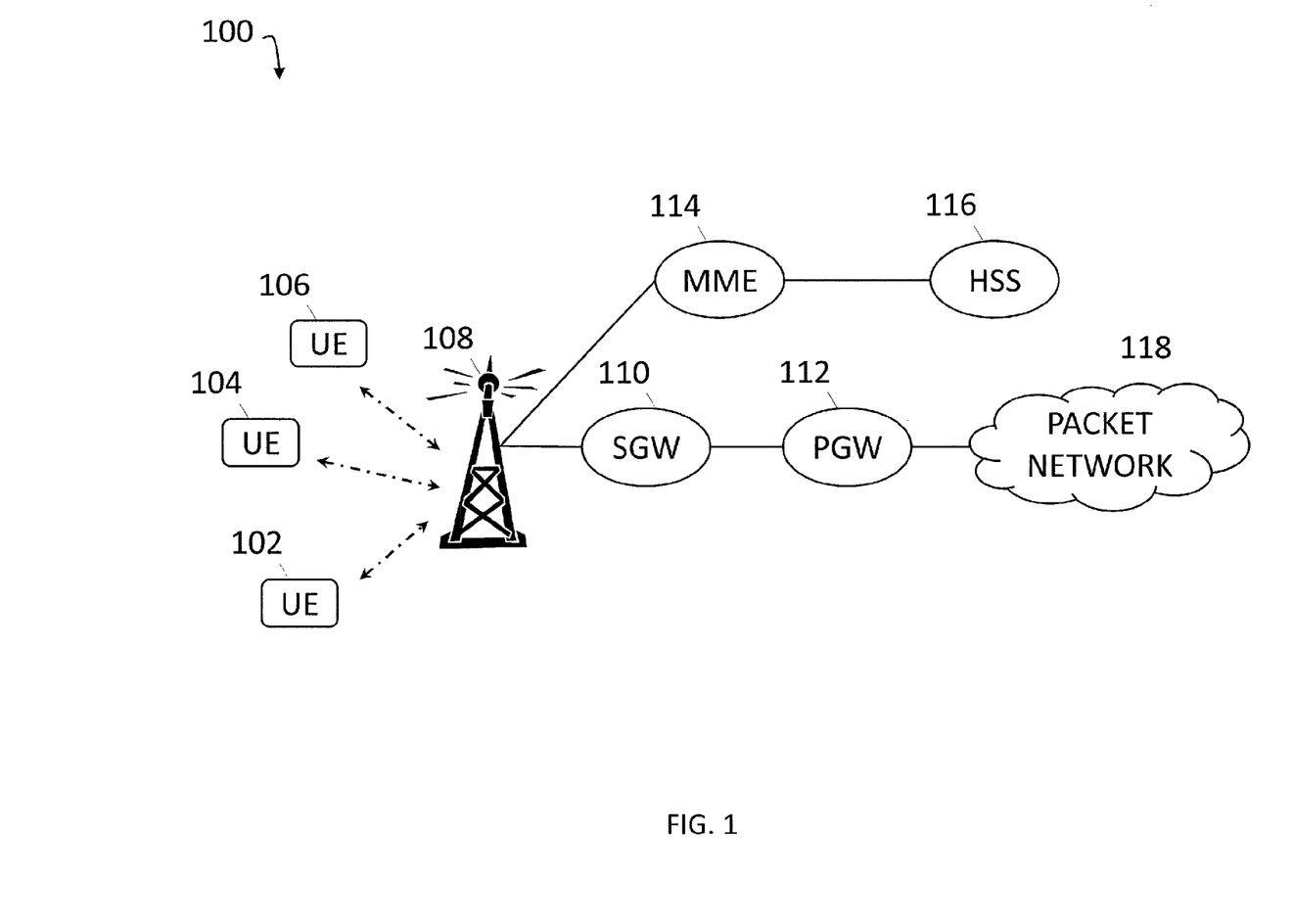
FIG. 1 is a diagram illustrating an exemplary conventional LTE network.

FIG. 1 diagram illustrating an exemplary conventional LTE network 100. In some embodiments, LTE network 100 may include one or more nodes of a system architecture evolution (SAE) core or evolved packet core (EPC) network and/or other nodes. Referring to FIG. 1, LTE Network 100 may include user equipment (UEs) 102-106, an evolved node B (eNB) 108, a serving gateway (SGW) 110, a packet gateway (PGW) 112, a mobility management entity (MME) 114, a home subscriber server (HSS) 116, and a packet network 118 (e.g., the Internet). UEs 102-106 may represent any suitable device usable by a user (e.g., a mobile subscriber) to communicate via or using LTE network 100. For example, UE 102 may be a mobile phone, a laptop, a tablet device, a computing platform, or other device for communicating via LTE network 100.

ENB 108 may represent any suitable entity (e.g., a base transceiver station (BTS), node B, etc.) for providing data via an air interface. For example, eNB 108 may be an LTE mobile network entity having functionality similar to that of a radio network controller (RNC) and a base station (BS) in 2G networks or an RNC and a Node B in 3G mobile networks. In some embodiments, eNB 108 may communicate directly with LTE user devices and may be responsible for header compression, ciphering, reliable delivery of packets, admission control, and radio resource management. ENB 108 may also communicate with various other modules and/or nodes, e.g., SGW 110, or a MME 114 for performing various control plane signaling functions such as network attaching, UE authentication, bearer channel setup, and mobility management. In some embodiments, eNB 108 may be directly connected via X2 interfaces.

SGW 110 may represent any suitable entity (e.g., a node containing a processor and a memory) for routing and forwarding data packets. For example, SGW 110 (and PGW 112) may include functions similar to and/or functions different from a gateway GPRS support node (GGSN) in a 3G network. SGW 110 may be nodes for providing data paths between eNBs and PGW 112. For example, SGW 110 and eNB 104 may communicate via an S1-U or other interface and SGW 110 and PGW 112 may communicate via an S5 or S8 interface. In some embodiments, SGW 110 may part of an EPC or system architecture evolution (SAE) network and packets may transverse SGW 110 using an eGTP or GTP protocol. SGW 110 may perform replication or notification procedures for lawful interception purposes. SGW 110 may also act as a mobility anchor for the user or data plane (e.g., during inter-eNB handovers). SGW 110 may manage and store UE contexts, e.g., information associated with the IP bearer service. For example, for an idle state UE, SGW 110 may terminate a downlink data path and initiate paging when downlink data arrives for the UE. SGW 110 may also be used for communicating with other mobile networks, such as 2G/3G networks. SGW 110 may provide charging services and/or policy enforcement for UE 102, network 118, and service classes.

PGW 112 may represent any suitable entity for communicating with external packet data networks, such as packet network 118. For example, PGW 112 may be an access point for traffic to UE 102 from packet network 118. PGW 112 may perform policy enforcement, packet filtering, charging support, lawful interception, and/or other functions. PGW 112 may also act as a mobility anchor between 3GPP and non-3GPP networks, such as CDMA and WiMAX networks. In some embodiments, UE 102 may have simultaneous connectivity with multiple PGWs for accessing multiple packet networks.

MME 114 may represent any suitable entity for performing one or more mobility management functions, such as tracking movements associated with UEs 102-106. In some embodiments, MME 114 may communicate information (e.g., mobility-related information) to other nodes in or associated with LTE network 100. For example, MME 114 may receive registration requests from eNB 108 and may communicate with HSS 116 for performing authentication and/or for updating the current location of the subscriber. Additionally, MME 114 may communicate with various other nodes and perform various other functions.

HSS 116 may represent any suitable entity for maintaining and/or providing one or more subscriber data management functions. HSS 116 may maintain subscriber-related information, such as user identification, control information for user authentication and authorization, location information, and user profile data. For example, HSS 116 may include a database containing details about subscribers associated with UEs 102-106, services available to UEs 102-106, and the current locations (e.g., current serving nodes) of UEs 102-106.

Packet network 118 may represent various nodes that communicate with UEs 102-106 via PGW 112. For example, packet network 118 may represent the Internet, or a portion thereof, and may include nodes external to an EPC network (e.g., SGW 110, PGW 112, MME 114, and HSS 116). Packet network 118 may include web servers, media servers, and other nodes for providing services and/or media content.

In some embodiments, UEs 102-106 and packet network 118 may communicate data packets via one or more tunneling protocols. For example, a GTP protocol or an eGTP protocol (e.g., eGTP-U) may be used to provide tunneling support for communicating user data between eNB 108 and EPC elements (e.g., SGW 110 and PGW 112). UE context information, such as GTP related TEIDs, medium access control (MAC) and/or IP addresses, may be stored in the data packets and tunnels may be set up between various nodes. In some embodiments, a GTP protocol or an eGTP protocol may be used for various interfaces, such as S1-U, S4, S5 and S8 interfaces. GTP tunnels may be used to carry encapsulated transport packet data units (T-PDUs) and signaling messages between tunnel endpoints. The transport bearer may be identified by a source TEID, a destination TEID, a source IP address, and/or destination IP address.

Figure 2:
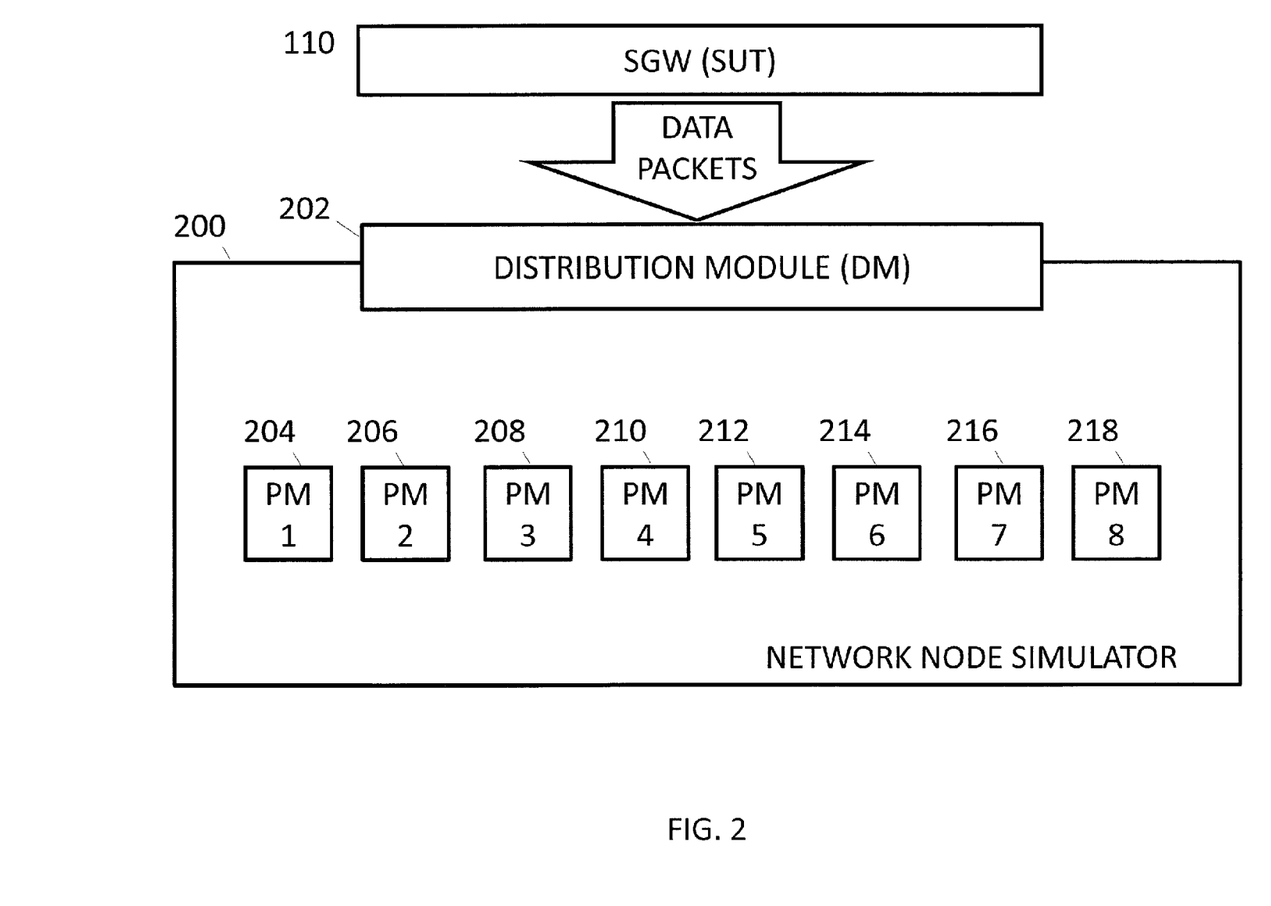
FIG. 2 is a diagram illustrating a network node simulator according to an embodiment of the subject matter described herein.

FIG. 2 is a diagram illustrating a network node simulator 200 according to an embodiment of the subject matter described herein. Network node simulator 200 may include a mobile network equipment simulation and/or testing platform for simulating and testing one or more aspects of a communications network and/or nodes therein. In some embodiments, network node simulator may include various modules (e.g., circuits and/or software executed by a processor) for connecting to various interfaces associated with one or more mobile network equipment or nodes. For example, network node simulator 200 may be configured to simulate UEs 102-106, eNB 108, MME 114, and/or HSS 116 for testing various aspects of one or more system(s) under test, e.g., an EPC network, or portions therein (e.g., SGW 110). In some embodiments, network node simulator 200 may configured to simulate layer 4-layer 7 (L4-L7) traffic using GTP and/or other tunneling protocols. For example, network node simulator 200 may include a multi-processor architecture and/or other modules for receiving and sending L4-L7 traffic via 40 Gbps links.

Referring to FIG. 2, network node simulator 200 may include a distribution module (DM) 202 and processing modules (PM) 204-218. DM 202 may represent any suitable entity for receiving, analyzing, and/or distributing data packets, such as GTP encapsulated real time protocol (RTP) or IP packets. DM 202 may include one or more communications interfaces. Each communications interface may communicate with one or more interfaces, e.g., via GTP or eGTP tunnels. For example, an S1 interface, an S11 interface, an X2 interface, and other interfaces associated with network node simulator 200 may be used for receiving or sending various messages.

In some embodiments, DM 202 may include a processor and/or a circuit, such as an FPGA or an ASIC, configured to receive, analyze, and/or distribute data packets. Data packets may be encapsulated within various headers and/or associated with various protocols. For example, data packet may include RTP packets, user datagram protocol (UDP) packets, or transmission control protocol (TCP) packets. In some embodiments, data packets may include an eGTP header. The eGTP header may include a destination TEID, a source TEID, or other identifiers, such as MAC addresses or IP addresses.

In some embodiments, DM 202 or a component therein may be configured to analyze GTP header information, e.g., a GTP related endpoint identifier, a TEID, or a PM identifier, for determining a PM among PMs 204-218 for processing a particular GTP encapsulated data packet. For example, an FPGA associated with DM 202 may examine the six most significant (e.g., left-most) bits of a TEID stored in a GTP header of a GTP encapsulated data packet. In this example, the six most significant bits may indicate a PM that should process the GTP encapsulated data packet. Using the analyzed GTP header information, DM 202 or a component therein may send the particular GTP encapsulated data packet to the determined PM for processing. For example, an FPGA associated with DM 202 may switch or send a GTP encapsulated data packet to an appropriate PM based on a PM identifier stored in a corresponding GTP header.

Each of PMs 204-218 may represent any suitable entity (e.g., a processor core, a processor, an FPGA, and/or an ASIC) usable for generating, receiving (e.g., from AM 202), processing, and/or simulating data packets, e.g., signaling or control plane packets. For example, PM 204 may generate various data packets and set up eGTP tunnels for communicating the data packets between UEs and packet network 118 via EPC nodes in network 100.

In some embodiments, one or more of PMs 204-218 may include functionality for managing simulation of various nodes (e.g., eNBs, MMEs, UEs, and/or other adjacent or related nodes). For example, PM 204 may perform multi-UE simulation, eNB simulation, UE call dispatching (including both real and simulated UEs), UE traffic profile configuration, call automation, quality of service (QoS) testing, selective reporting and/or statistics, and call tracing.

In some embodiments, one or more PMs 204-218 may execute user scripts for performing various actions or simulations. For example, user scripts may include or indicate various simulation scenarios, such as predetermined sequences of messages representing simulated actions performed by simulated UEs. In some embodiments, user scripts may include one or more pre-defined scripts for simulating different LTE traffic/load scenarios in which multiple UEs are connected to an eNB. At any given time, the load on a simulated eNB may include UEs continuously connecting and disconnecting to the network, making and receiving calls, sending data, roaming to another eNB within the network, etc. Moreover, the particular mix of UEs and how they behave may be highly dependent upon the network carrier and/or the SUT's location within the network. Therefore, user scripts may include a wide variety of primitive/basic operations that are typically performed by individual UEs so that a network operator can customize their simulated traffic mix to be similar to real world scenarios of interest.

For example, user scripts may include originating scripts associated with a simulated UE that originates a call/session. Originating scripts may include, but are not limited to, attach, detach, session establishment and release, handover, session initiation protocol (SIP) calls, file transfer protocol (FTP) calls, and hypertext transfer protocol (HTTP) calls.

Conversely, user scripts may also include terminating scripts associated with a simulated UE that terminates a call/session such as MME-initiated detach, HSS-initiated detach, handover, and SIP/FTP/HTTP calls.

In some embodiments, AM 202 and/or one or more PMs 204-218 may include functionality for generating or assigning GTP related endpoint identifiers (e.g., TEIDs) that are associated with one or more simulated UEs. In such embodiments, each GTP related endpoint identifier may indicate a PM for handling processing of related traffic. For example, PM 204 may include a management module configured to allocate or assign simulated UEs among PMs 204-218. In this example, PM 204 may utilize an algorithm (e.g., a round robin technique or a load-based technique) for allocating local TEIDs or other GTP related endpoint identifiers such that traffic associated with a given UE is handled by a particular PM as indicated by a respective GTP related endpoint identifier. In some embodiments, AM 202 and/or each of PMs 204-218 may handle traffic for a same number of simulated UEs such that incoming traffic is evenly distributed among PMs 204-218.

In some embodiments, AM 202 and/or one or more PMs 204-218 may utilize an allocation technique for assigning a TEID or other GTP related endpoint identifier such that GTP traffic is distributed and processed, e.g., efficiently and evenly by PMs 204-218. For example, AM 202 and/or one or more PMs 204-218 may assign a PM identifier using one or more (e.g., six most significant) bits associated with a TEID. In this example, a UE '1' executing on PM 204 may be assigned a TEID of '0x00000021' for a default bearer, a UE '2' executing on PM 206 may be assigned a TEID of '0x04000021' for a default bearer, a UE '3' executing on PM 208 may be assigned a TEID of '0x08000021' for a default bearer, and so and so forth.

In contrast to an exemplary allocation technique described herein, a conventional TEID allocation may fail to represent or indicate a unique processor and may instead just be an incrementing values. For example, a conventional TEID allocation may include a UE '1' assigned a TEID of '0x00000021' for a default bearer, a UE '2' assigned a TEID of '0x00000042' for a default bearer, a UE '3' assigned a TEID of '0x00000063' for a default bearer, and so on and so forth with every subsequent UE receiving a TEID incremented by '0x21'.

In some embodiments, AM 202 and/or one or more PMs 204-218 may include functionality for assigning or allocating GTP related endpoint identifiers at or during a GTP establishment procedure, such as an initial attachment procedure, a packet data network (PDN) connectivity procedure, or a dedicated bearer procedure.

It will be appreciated that FIG. 2 is for illustrative purposes and that various nodes and/or modules, locations, and/or functionality described above in relation to FIG. 2 may be changed, altered, added, or removed.

Figure 3:
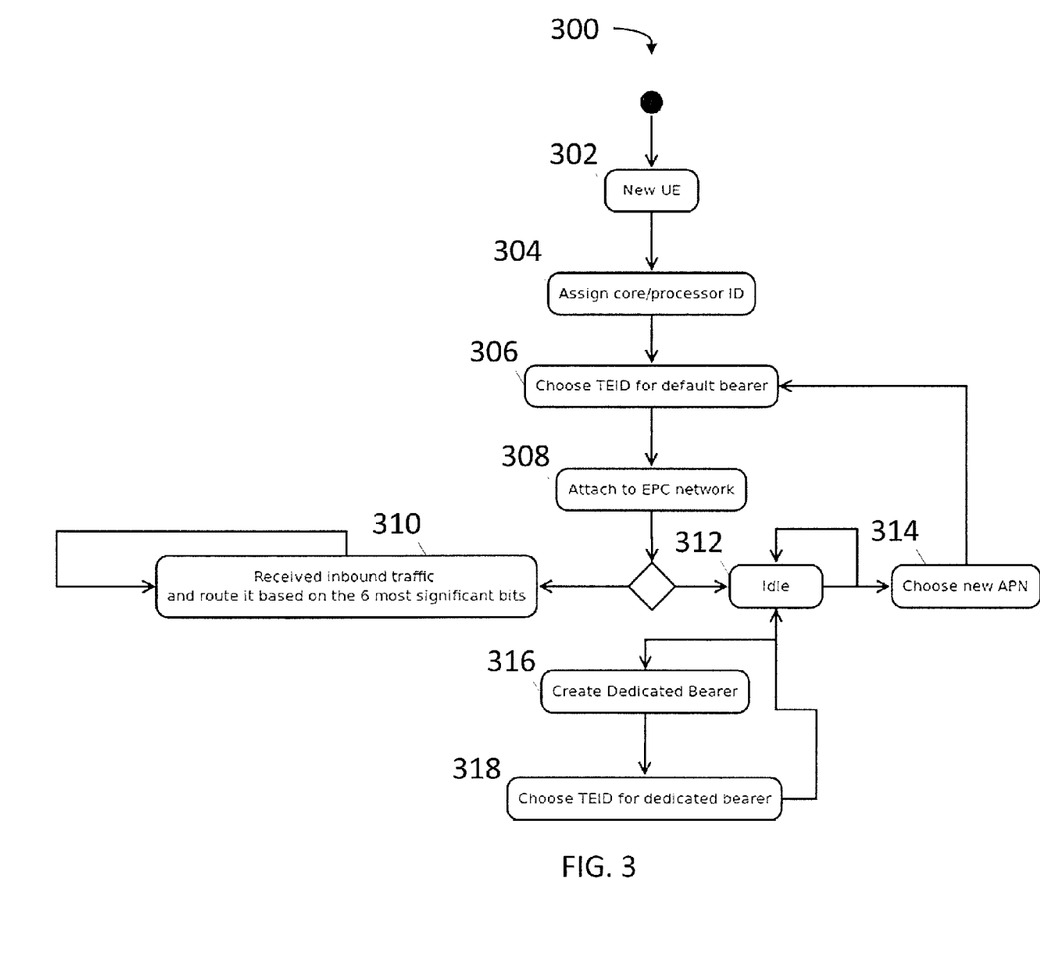
FIG. 3 is a diagram illustrating an exemplary process for allocating and using GTP related tunnel endpoint identifiers (TEIDs) according to an embodiment of the subject matter described herein.

FIG. 3 is a diagram illustrating an exemplary process 300 for allocating and using GTP related TEIDs according to an embodiment of the subject matter described herein. In some embodiments, network node simulator 200 or modules therein may perform process 300 or portions thereof.

At step 302, a new UE may be simulated. For example, network node simulator 200 may be configured (e.g., by an operator) to simulate one or more UEs for testing one or more nodes in an EPC network.

At step 304, a processor identifier (e.g., for indicating a processing resource, such as PM 204) may be assigned and/or associated with the simulated UE. For example, network node simulator 200 or a module therein may determine based on a UE-to-PM allocation technique that a simulated UE is associated with PM 210. In this example, exemplary UE-to-PM allocation techniques may include a load balancing method, a round robin method, or another method for associating a UE and a PM.

In some embodiments, simulated UEs may be distributed or assigned processor identifiers at the beginning of the simulation and/or prior to generated traffic and/or receiving traffic associated with the simulated UEs. For example, assuming eight UEs are to be simulated by a network node simulator 200 having a multi-core processor, each of the eight simulated UEs may be assigned a processor identifier indicating a different core.

At step 306, a TEID may be chosen or allocated for a default bearer associated with the simulated UE. For example, at, before, or during a GTP establishment procedure, network node simulator 200 or a module therein may be configured to generate a TEID containing or indicating an associated processor identifier.

In some embodiments, an exemplary TEID allocation technique may be used to scale (e.g., linearly) GTP traffic with the number of available PMs 204-218. For example, the more PMs a network node simulator can utilize, the more traffic that can be handled, e.g., at or near line speed.

In some embodiments, TEIDs or other GTP related endpoint identifiers may be generated by network node simulator 200 or a module therein for each bearer, default, dedicated, and/or indirect forwarding tunnel associated with a simulated UE.

In some embodiments, TEIDs or other GTP related endpoint identifiers may be stored in a bearer context information element (IE). For example, bearer context IEs may be located in a create session request message, a modify bearer request message, a create bearer response message, and/or a create indirect data forwarding request message.

At step 308, the simulated UE may attach to an EPC network. For example, network node simulator 200 or a module therein may be configured to perform an initial attachment procedure on behalf of or as a simulated UE.

At step 310, inbound traffic associated with the simulated UE may be received and routed based on a processor identifier in the GTP header(s). For example, an FPGA associated with network node simulator 200 may be configured to route a GTP encapsulated data packet based on the six most significant bits of a TEID parameter value in a related GTP header.

At step 312, a TEID allocation process may enter an idle state and may wait for changes in network conditions and/or requests for new and/or modified tunnels. For example, a simulated UE may use a default bearer for a certain amount of time before needing and/or requesting a dedicated bearer. In this example, the TEID allocation process may idle (for this UE) until a new dedicated bearer is requested.

At step 314, a new access point name (APN) may be selected or chosen. For example, a simulated UE may change from using PGW 112 to a new PGW. In this example, a new default bearer may be requested between SGW 110 and the new PGW.

In some embodiments, after selecting a new APN for a simulated UE, step 306 may occur. For example, network node simulator 200 or a module therein may be configured to generate a different TEID containing or indicating an associated processor identifier.

At step 316, a dedicated bearer may be requested for creation. For example, SGW 110 may send a create bearer request message to network node simulator 200 or a MME being simulated by network node simulator 200. In response, network node simulator 200 may generate an appropriate TEID containing a processor identifier and send the TEID in a bearer context IE within a create bearer response message.

At step 318, a TEID may be chosen or allocated for a dedicated bearer associated with the simulated UE. For example, at, before, or during a dedicated bearer procedure, network node simulator 200 or a module therein may be configured to generate a TEID containing or indicating an associated processor identifier.

In some embodiments, after creating a dedicated bearer, step 312 may occur. For example, network node simulator 200 or a related module may enter an idle state associated with allocating TEIDs.

It will be appreciated that FIG. 3 is for illustrative purposes and that additional and/or different steps may occur than those described above with regard to FIG. 3.

Figure 4:
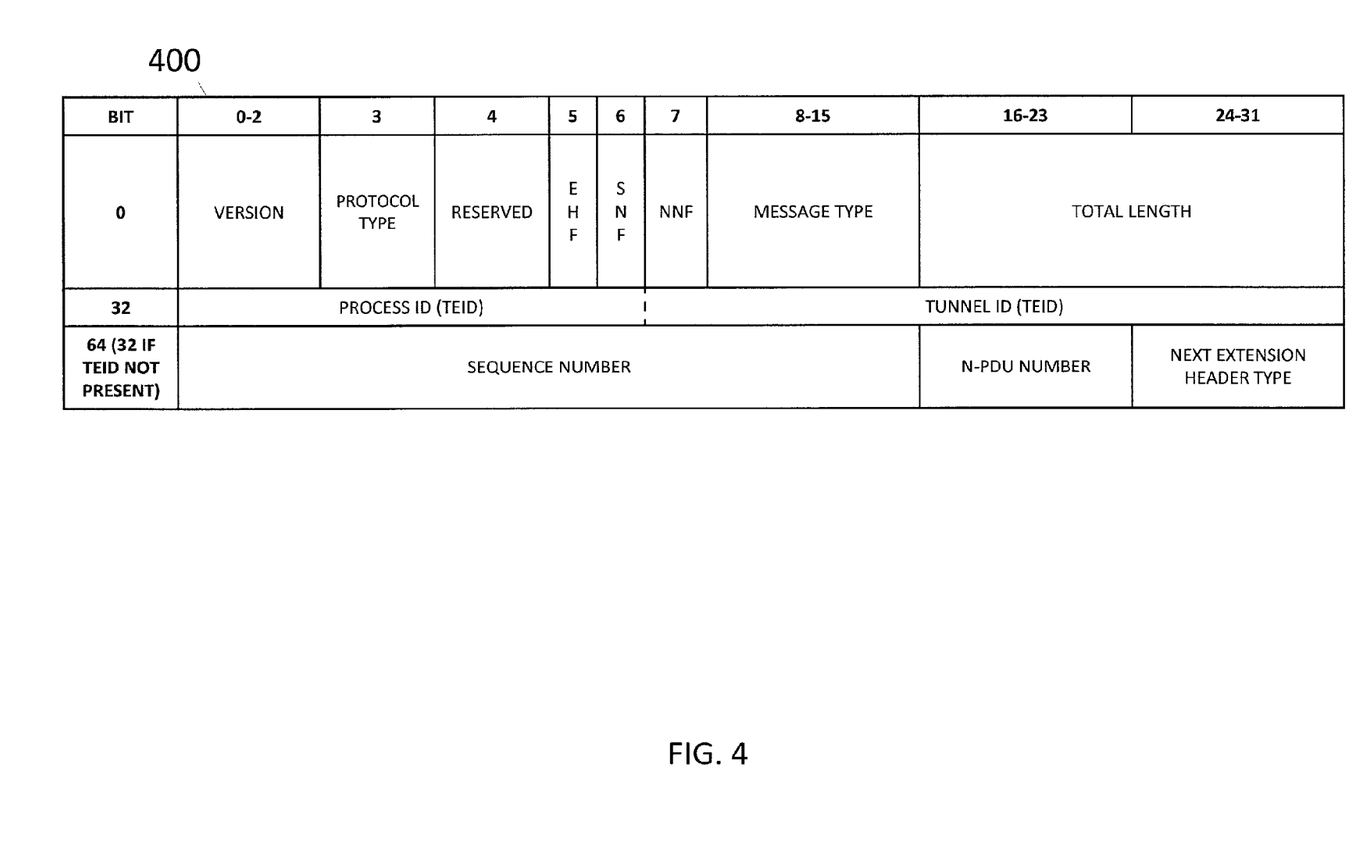
FIG. 4 is a diagram illustrating exemplary GTP header information according to an embodiment of the subject matter described herein.

FIG. 4 is a diagram illustrating exemplary GTP header information according to an embodiment of the subject matter described herein. Referring to FIG. 4, an exemplary GTP header portion 400 may be depicted. For example, GTP header portion 400 may represent exemplary GTP header information, e.g., associated with GTP version 1 and/or GTP-U.

GTP header portion 400 may include a version parameter, a protocol type (PT) parameter, a reserved parameter, extension header flag parameter, a sequence number flag parameter, an N-PDU number flag parameter, a message type parameter, a total length parameter, a TEID parameter, a sequence number parameter, an N-PU number parameter, and/or a next extension header type parameter.

In some embodiments, a version parameter may represent a 3-bit field and/or value for indicating a version associated with GTP. For example, a version parameter may include a value of '1' for GTP version 1 or a value of '2' for GTP version 2.

In some embodiments, a PT parameter may represent a 1-bit field or value for differentiating between GTP (e.g., '1') and GTP' (e.g., '0').

In some embodiments, a reserved parameter may represent a 1-bit field or value that is reserved for future use and may be '0'.

In some embodiments, an extension header flag parameter may represent a 1-bit field or value for indicating whether an extension header is optional. For example, an extension header flag parameter may include a value of '0' when the next extension header field either is not present or should not be interpreted. In another example, an extension header flag parameter may include a value of '0' when the next extension header field is present and should be interpreted.

In some embodiments, a sequence number flag parameter may represent a 1-bit field or value for indicating whether a sequence number is optional. For example, a sequence number flag parameter may include a value of '0' when the sequence number field either is not present or should not be interpreted. In another example, a sequence number flag parameter may include a value of '0' when the sequence number field is present and should be interpreted.

In some embodiments, an N-PDU number flag parameter may represent a 1-bit field or value for indicating whether a N-PDU number is optional. For example, an N-PDU number flag parameter may include a value of '0' when the N-PDU number field either is not present or should not be interpreted. In another example, an N-PDU number flag parameter may include a value of '0' when the N-PDU number field is present and should be interpreted.

In some embodiments, a message type parameter may represent an 8-bit field and/or value for indicating the type of GTP message. For example, a message type parameter may include a value of '16' for a create packet data protocol (PDP) context request or a value of '17' for a create PDP context response.

In some embodiments, a total length parameter may represent a 16-bit field and/or value for indicating the length in octets or bytes of the payload.

In some embodiments, optional parameters, such as a sequence number parameter, an N-PDU number parameter, or any extension headers, may be considered to be part of the payload and included in the total length value.

In some embodiments, a TEID parameter may represent a 32-bit field and/or value for identifying a tunnel endpoint, e.g., in a receiving entity. For example, a receiving end side of a GTP tunnel may locally assign the TEID value the transmitting side has to use. In this example, the TEID may be used by the receiving entity to find a PDP context associated with a UE.

In some embodiments, a TEID parameter may include a processor identifier and a tunnel identifier. For example, the left most six bits of the TEID parameter may be used for identifying a processor that is to process a corresponding GTP encapsulated data packet and the remaining bits of the TEID parameter may be for identifying a tunnel endpoint.

In some embodiments, a next extension header parameter may represent an optional 8-bit field and/or value for defining an extension header that follows this field in a GTP packet data unit (PDU).

It will be appreciated that FIG. 4 is for illustrative purposes and that GTP header portion 400 may include additional and/or different information from the information described above.

Figure 5:
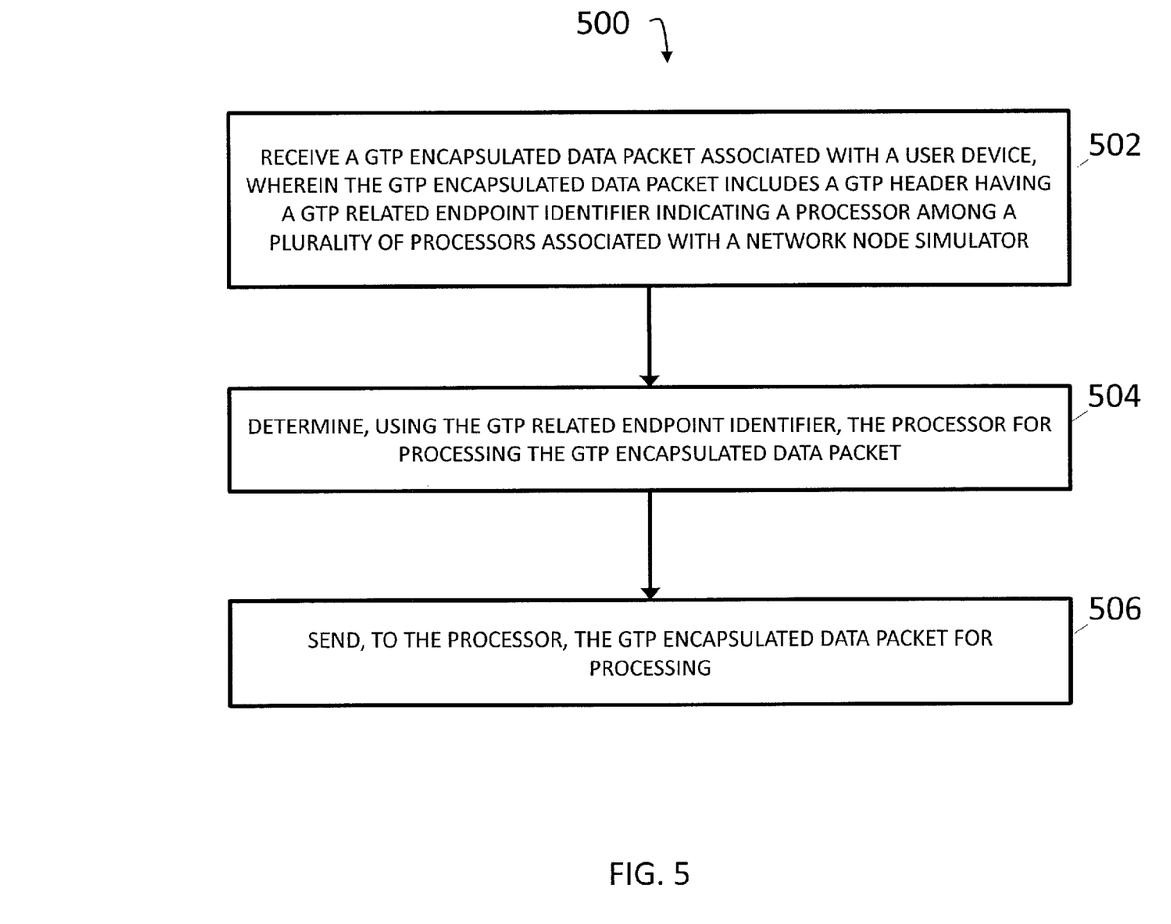
FIG. 5 is a diagram illustrating an exemplary process for distributing GTP traffic according to an embodiment of the subject matter described herein.

FIG. 5 is a diagram illustrating an exemplary process for distributing GTP traffic according to an embodiment of the subject matter described herein. In some embodiments, exemplary process 500, or portions thereof, may be performed by network node simulator 200, DM 202, PMs 204-218, and/or another node or module. For example, exemplary process 500, or portions therein, may occur at network node simulator 200 configured to distribute GTP encapsulated data packets among a plurality of processors associated with network node simulator 200.

At step 502, a GTP encapsulated data packet associated with a user device may be received. The GTP encapsulated data packet may include a GTP header having a GTP related endpoint identifier indicating a processor among the plurality of processors associated with the network node simulator. For example, a GTP encapsulated data packet containing a TEID may be received from a SUT.

In some embodiments, a SUT may include a simulated network node, a core network node, a gateway, a mobility management entity, or a server. For example, the network node may include a SGW, a PGW, and/or other nodes in an EPC network or an LTE network. In another example, the network node may be simulated by another node or module, e.g., network node simulator 200 or other mobile network equipment simulation and/or testing platform.

In some embodiments, a GTP related endpoint identifier (e.g., a TEID) may be assigned during a GTP establishment procedure, an initial attachment procedure, a packet data network (PDN) connectivity procedure, or a dedicated bearer procedure.

In some embodiments, a GTP related endpoint identifier (e.g., a TEID) may be negotiated using a bearer context IE. For example, network node simulator 200 may emulated MME functionality and/or may send a create session request containing a bearer context IE to SGW 110. In this example, the bearer context IE may include a GTP related endpoint identifier, such as a TEID.

In some embodiments, a GTP related endpoint identifier (e.g., a TEID) may be assigned by network node simulator 200.

In some embodiments, a GTP related endpoint identifier may include a TEID or other tunnel identifier.

In some embodiments, a GTP related endpoint identifier (e.g., a TEID) may include a processor identifier and a tunnel identifier.

At step 504, the processor for processing the GTP encapsulated data packet may be determined using the GTP related endpoint identifier. For example, DM 202 may analyze a TEID parameter value contained in a GTP encapsulated data packet and may determine that a PM 204 is to process the data packet based on a PM identifier in a portion of the TEID parameter value (e.g., the six most significant bits of the TEID parameter value) being associated with PM 204.

At step 506, the GTP encapsulated data packet may be sent to the processor for processing.

The data packet may include a GTP related endpoint identifier for identifying a first transceiver simulated by the network node simulator. For example, a data packet may be received via an eGTP tunnel between SGW 108 and network node simulator 200. The packet may include a TEID that indicates an eNB simulated by network node simulator 200.

In some embodiments, the data packet may include an RTP packet, a UDP packet, or a TCP packet. In some embodiments, the data packet may be received by or at a communications interface associated with network node simulator 200 or DM 202. In some embodiments, DM 202 and/or one or more PMs 204-218 may include a FPGA, an ASIC, or a processor.

In some embodiments, network node simulator 200 or a module therein may include an FPGA or an ASIC.

It should be noted that network node simulator 200, its components, and/or functionality described herein may constitute a special purpose test device. Further, network node simulator 200, its components, and/or functionality described herein can improve the technological field of testing network devices and can improve distribution of GTP traffic among multiple processors associated with testing equipment.

The subject matter described herein for distributing GTP packets among processors using processor identifiers embedded in GTP headers improves the functionality of network node simulators and GTP packet distribution in general by providing for more efficient packet distribution. It should also be noted that a network node simulator that implements the subject matter described herein may comprise a special purpose computing device usable to test data network and storage network equipment.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for distributing general packet radio service (GPRS) tunneling protocol (GTP) traffic, the method comprising:

at a network node simulator configured to distribute GTP encapsulated data packets among a plurality of processors associated with the network node simulator:
assigning a GTP related tunnel endpoint identifier (TEID) to a user device based on which processor of the plurality of processors is to process GTP encapsulated data packets received from the user device;
receiving a GTP encapsulated data packet associated with the user device, wherein the GTP encapsulated data packet includes a GTP header having the TEID indicating a processor among the plurality of processors associated with the network node simulator, wherein the TEID includes a first portion that serves as a processor identifier and a second portion that serves as a tunnel identifier;
determining, using the processor identifier in the TEID, the processor for processing the GTP encapsulated data packet; and
sending, to the determined processor, the GTP encapsulated data packet for processing.

2. The method of claim 1 wherein the TEID is assigned during a GTP establishment procedure, an initial attachment procedure, a packet data network (PDN) connectivity procedure, or a dedicated bearer procedure.

3. The method of claim 1 wherein the TEID is negotiated using a bearer context information element (IE).

4. The method of claim 1 wherein the network node simulator includes a field-programmable gateway array (FPGA) or an application-specific integrated circuit (ASIC).

5. A system for distributing general packet radio service (GPRS) tunneling protocol (GTP) traffic, the system comprising:

a network node simulator comprising:
a plurality of processors, wherein the network node simulator is configured to distribute GTP encapsulated data packets among a plurality of processors associated with the network node simulator by assigning a GTP related tunnel endpoint identifier (TEID) to a user device based on which processor of the plurality of processors is to process GTP encapsulated data packets received from the user device; receiving a GTP encapsulated data packet associated with the user device, wherein the GTP encapsulated data packet includes a GTP header having the TEID indicating a processor among the plurality of processors associated with the network node simulator, wherein the TEID includes a first portion that serves as a processor identifier and a second portion that serves as a tunnel identifier; determining, using the processor identifier in the TEID, the processor for processing the GTP encapsulated data packet; and sending, to the determined processor, the GTP encapsulated data packet for processing.

6. The system of claim 5 wherein the TEID is assigned during a GTP establishment procedure, an initial attachment procedure, a packet data network (PDN) connectivity procedure, or a dedicated bearer procedure.

7. The system of claim 5 wherein the TEID is negotiated using a bearer context information element (IE).

8. The system of claim 5 wherein the network node simulator includes a field-programmable gateway array (FPGA) or an application-specific integrated circuit (ASIC).

9. A non-transitory computer readable medium comprising computer executable instructions embodied in a computer readable medium that when executed by a processor of a computer control the computer to perform steps comprising:

at a network node simulator configured to distribute GTP encapsulated data packets among a plurality of processors associated with the network node simulator:
  assigning a GTP related tunnel endpoint identifier (TEID) to a user device based on which processor of the plurality of processors is to process GTP encapsulated data packets received from the user device;
  receiving a GTP encapsulated data packet associated with the user device, wherein the GTP encapsulated data packet includes a GTP header having the TEID indicating a processor among the plurality of processors associated with the network node simulator, wherein the TEID includes a first portion that serves as a processor identifier and a second portion that serves as a tunnel identifier;
  determining, using the processor identifier in the TEID, the processor for processing the GTP encapsulated data packet; and
  sending, to the determined processor, the GTP encapsulated data packet for processing.

10. The non-transitory computer readable medium of claim 9 wherein the TEID is assigned during a GTP establishment procedure, an initial attachment procedure, a packet data network (PDN) connectivity procedure, or a dedicated bearer procedure.

11. The non-transitory computer readable medium of claim 9 wherein the TEID is negotiated using a bearer context information element (IE).

12. The non-transitory computer readable medium of claim 9 wherein the network node simulator includes a field-programmable gateway array (FPGA) or an application-specific integrated circuit (ASIC).

* * * * *